(12) United States Patent
Kwan

(10) Patent No.: US 7,395,234 B2
(45) Date of Patent: Jul. 1, 2008

(54) METHOD, APPARATUS AND PROGRAM FOR PRICING, TRANSFERRING, BUYING, SELLING AND EXERCISING FINANCIAL OPTIONS FOR PAYING EDUCATIONAL COURSE FEES

(76) Inventor: Khai Hee Kwan, 6/78 Houston Rd, Kingsford NSW (AU) 2032

( * ) Notice: Subject to any disclaimer, the term of this patent is extended or adjusted under 35 U.S.C. 154(b) by 1544 days.

(21) Appl. No.: 09/922,489

(22) Filed: Aug. 6, 2001

(65) Prior Publication Data
US 2002/0042767 A1 Apr. 11, 2002

Related U.S. Application Data

(60) Provisional application No. 60/224,897, filed on Aug. 14, 2000.

(51) Int. Cl.
*G06Q 40/00* (2006.01)
(52) U.S. Cl. .................................................. 705/36 R
(58) Field of Classification Search ................ 705/36 R
See application file for complete search history.

(56) References Cited

U.S. PATENT DOCUMENTS

| | | | |
|---|---|---|---|
| 6,862,579 B2 * | 3/2005 | Mathews et al. .......... | 705/36 R |
| 2002/0004782 A1 * | 1/2002 | Cincotta ....................... | 705/39 |
| 2005/0144118 A1 * | 6/2005 | Dev et al. ...................... | 705/38 |
| 2008/0033864 A1 * | 2/2008 | McDonough ................ | 705/37 |

OTHER PUBLICATIONS

Archived Eduoption web page, retrieved from [URL: http://web.archive.org/web/20020813215330/barcodeticket.com/eduoption] on Feb. 7, 2008.*

* cited by examiner

*Primary Examiner*—Susanna M Diaz

(57) ABSTRACT

An apparatus, method and program for user to contract a future education fee amount now and paying for the said education fees in the future. This is done by way of a contract agreeable between the institution and the user where the future fee is only payable if said user is being offered admission to the institution. The user in initiating this contract provides details of the amount that can be paid in the future for a specific course, past academic results, time to commencement, personal data, flexibility factor, the intended course etc. The responding institution will determine whether the presented merits a contract to fix a future education course fee today. If the institution should decide to offer this contract then a premium is calculated to secure this contract. The benefits of this invention is that users will be able to lock in their future education fee today at a price which they believe they can afford in the future but more importantly they will have security that if accepted by the institution, the cost is fixed and hence they can plan for their funding today. And from the institution's point of view, they will have a first hand opportunity to select from a pool of candidates to fill up courses admission. These contracts are conditional upon receiving an admission by contracting institution and provide a right but not obligation to pay the fixed education fees. By contracting early and receiving a premium, these institutions will be reliably funded and at a cheaper rate as well.

22 Claims, 8 Drawing Sheets

NOTE TO INTERNET USERS, YOU HAVE TO REGISTER FIRST BEFORE USING.

| CLICK HERE TO REGISTER. |

REGISTERED USERS PLEASE SIGNED IN. THIS IS A SECURED WEBSITE.

NAME

PASSWORD

AGAIN TO CONFIRM

BUY   SELECT TYPE OF OPTIONS

SELL  SELECT TYPE OF OPTIONS

☐ TICK HERE TO SHOW YOUR PORTFOLIO   PRESS RETURN

NO PASSWORD IS REQUIRED FOR SERVICES BELOW.
PLEASE FEEL FREE TO BROWSE OUR SITE. YOUR FEEDBACK IS IMPORTANT TO US.

BROWSE   ALL OR CLICK TO SELECT

LIST OF INSTITUTIONS   CLICK TO SELECT

FEEDBACK

FORGOT YOUR PASSWORD AND USER NAME ? USE OUR FORM HERE

FIG 8

METHOD, APPARATUS AND PROGRAM FOR PRICING, TRANSFERRING, BUYING, SELLING AND EXERCISING FINANCIAL OPTIONS FOR PAYING EDUCATIONAL COURSE FEES

CROSS-REFERENCE TO RELATED APPLICATIONS

This application claims the benefit of U.S. Provisional Application No. 60/224,897, filed on Aug. 14, 2000.

STATEMENT REGARDING FEDERAL SPONSORED RESEARCH OR DEVELOPMENT

Not Applicable

REFERENCE TO A MICROFICHE APPENDIX

Not Applicable

BACKGROUND OF THE INVENTION

1. Technical Field

This invention advantageously relates to a method, apparatus and program for pricing, transferring, buying, selling and exercising financial options for education courses fees.

2. Description of the Related Art

The present invention relates to the field of pricing, transferring, buying, and selling of a financial option for Education Course Fees. Education course fees, particularly in Higher Education are constantly changing as well as rising, with availability subject to present economic situation. More parents/guardians would like to be able to pay for their children's education course fees while they are still able or at least to lock in the cost. Unfortunately at this time, there is no system nor device allowing for such up-front partial payment or locking the cost even if that is permissible. The main reason is that one cannot "buy" or "book" for something when one is not sure whether one will be offered at all, eventually. What is offered by this invention is to lock in the cost of education. As a general rule, university's degree places are earned by merit and not by financial means. That is unless prospective students wishing to study in an University or an Institute of Higher Learning have passed certain examinations, can they then apply for admissions and only then pay for this fees of the course that they are studying. On the other hand, it is not prudent for the University to offer a seat and charge for such a placement when there is no way of knowing whether such a person is able to qualify or not. To begin to recognise this need, one must be able to distinguish the difference between 1) being offered a place and 2) paying for the course fees. The rational for this design is that only the latter is transferable, that is the course fees and not the offering of a place to a specific individual either in the present or future. This relationship is not as alien or new since from the olden days benefactors have been paying for the fees of a person who is admitted to study at a particular institution. The only qualification this benefactor (other than the student or immediate family) is money. In this case, our 'benefactor' is someone that has bought an option to pay for an education course which he might or might not take up later. He can use it for himself, or for another person (making it transferable) or sell it for a profit on the open market when it is in the money. The benefactor can be anyone having such financial ability including corporate entity. On the other hand the student's admission is one of merit and as such is not transferable or change or modify. The position that is offered is for that individual and no one else. The principle for this system to work is that the payment for the course fees are made transferable to whoever who is willing to do so while the admission is not transferable or ever made transferable. In short, a seat or placement offer is unique to its recipient but not the means of paying for it which is transferable to anyone who wishes to make payment. The rational for splitting this two is sound since preserves the system of meritocracy and opens opportunities for benefactors to sponsor deserving students by locking in future educational cost. Furthermore given the intense competition to seek funds by University/Institution of Higher Learning, this is a progressive way to ensure that funding can be achieved at a lower cost and follows the principal of investing in ones future education literally. While there are education fund where parents are likely to invest their money in anticipation of using it as university fees later, there is no guarantee that such education fund can never go bankrupt in between the years or the invested amount is short of the required fees. By using an option, one is guaranteed the exact remaining payment when one wants to exercise the option. There is no guarantee at all with investment schemes which are not tied to the University/Institute of Higher Learning that one is interested in applying for later.

Until now, there is no suitable way to minimise these drawbacks and enable the potential student or his/her family to lock in affordable future educational fee without tying up his/her money at the current time. Option contracts ("Option"), are known in other fields as a way of locking in a particular purchasing price for a given commodity. Because of this, options can be used by buyers to minimise the risk of rising prices and sellers for falling prices. One of the most widely known types of options is the covered option to purchase stocks or company securities. The issuer of this type of option owns a number of shares of a particular stock. The buyer of this type of option has the right to purchase from the issuer of the options, a predetermined number of shares of the stock, at a predetermined price, at any time before the option expires. This "style" is usually called the American Option while the European Option means, the buyer can only exercise at a fixed date as set out in the terms of sale of the option.

As explained earlier, there has been no acceptable way of minimising the risk of fluctuations in education courses fees and as far as I am aware, options to purchase or pay for education courses fees have never been sold or traded any where in the world nor considered until this time. Moreover no system has been developed for determining prices for options for education courses fees and keeping track of the sale and exercise of these options.

OBJECTS OF INVENTION

It is an object of this invention to provide an improved way to pay/receive/fund for higher education fees by providing the method, apparatus and program for pricing, buying, selling and exercising options to pay for education courses fees.

DESCRIPTION OF INVENTION

The Inventor has developed a method of utilising a telecommunications service system host computer connecting to various terminal system including Automatic Teller Machines (ATM) which is linked to a public telephony system network or through the Internet where applicable. The system consists at least a network of computer system with a multi-communication interface running on Windows NT or Unix or Linux platform with programming using Java, MS SQL or Oracle 8 or DB2, Visual Basic, C plus language or any suitable programming language.

Thus according to one embodiment of the invention there is provided, a process system comprising:

receiving an incoming request from a terminal through the public telephony system network via a modem or through the Internet or any connecting interface suitable for this purpose, authenticate the users, respond with the appropriate welcoming message, inputting forms and wait for a response, prompted the user with the information provided after inputting and registering the desired information, this will be then sent to the central controller for processing. The sending process is through a telephone line or through the Internet interfacing with a modem. The central controller will process the information and sent a reply/response through the same way back to the user. The above process is repeated again until the user is satisfied with his results.

The system is also able to process the option price for the courses and rank results of its suitability. Stored all inputted data and maintain a database for all actions taken during its process and those instructed by the users, for example purchasing the option or selling it later. In line with the database concept, it can also do search, match, rank as well any secondary functions within its program.

The present invention means the possibility of a new way to finance education courses, to lock in the cost of education cost using options and a means to execute using an external communicating devices such as a terminal. It will also provide Institutions of higher learning an opportunity to seek self-financing by reaching their potential clients at a reduced cost. An opportunity to minimise but not eliminate the risk of rising education cost.

BRIEF DESCRIPTION OF THE DRAWINGS

FIG. 8. Depicts the WWW page interface format.

DESCRIPTION IN DETAIL OF THE PREFERRED EMBODIMENTS

The present invention is directed to a system to determining an appropriate price for options to purchase educational course fees and facilitating the sale and the exercising of the options.

The traditional methods of determining prices for options on stocks and traditional commodities are not suited in the education courses market due to the unique nature of these fees. To begin with (1) the product (ie Higher learning education courses and its attached fees) is only supplied by a limited of universities; (2) the product is not completely fungible because certain potential students may prefer studying at a particular university or in certain country or even state where such university exists or certain unique courses being offered there and (3) the supply of the product is small because only a limited number of placement/seats are available on any given year of offering.

Figure 1:
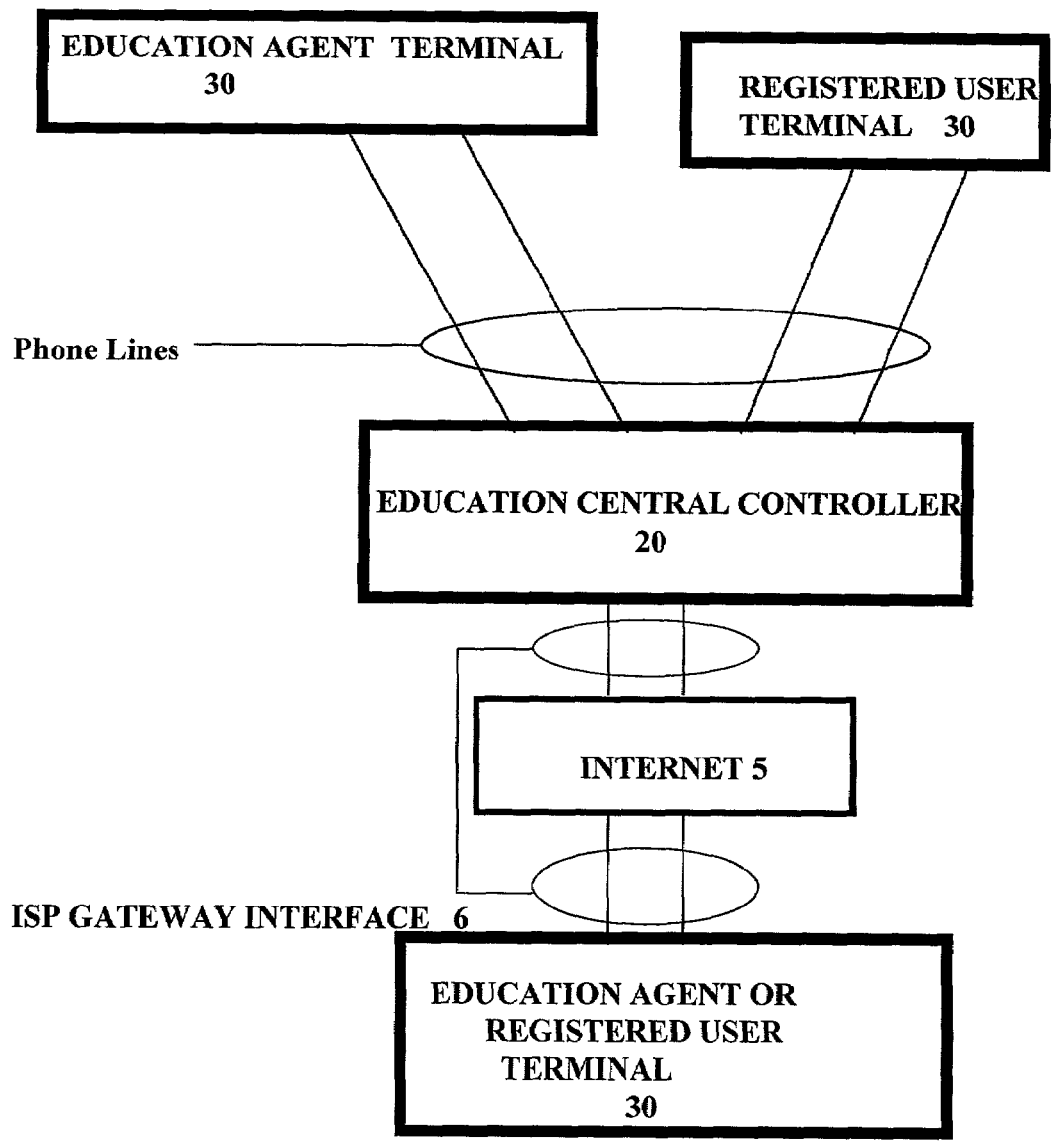
FIG. 1. Depicts the overall system block diagram of an preferred embodiment of the present invention.

The use of options for university/higher education courses fees is further complicated by the fact that the career plans of different individual students have different degree of flexibility. An extreme example is a case where a student wants to study in a particular year, in a particular university and under a particular professor in order to satisfy his academic and intellectual needs. This can be a case where students are doing their postgraduate studies under a particular professor especially in the field of medicine where tutelage under certain professor carries a high premium later in one's career, the so called connection factor. The other extreme is where the student does not mind or not even particular which university or course or period of finishing, he/she just wants to finish a course and hence is very flexible in his/her choice of university. The only unknown is whether he is qualified to enter such and such an university or institute of higher learning. This setback can only be ascertain when his results are submitted to the university/higher learning for assessment when the time comes. Say for example, if he does not qualify, then he can't exercise since there is no point for him to do so. What is clear is that as long as there is time, the holder can still sell the option to another who may wish to take it up by exercising it. The offer of a place is made known at least 2 months in advance giving the holder of the option to do the necessary. As in most cases, the holder may yet be able to cash out by selling at a handsome profit as long as it is less than the current course fees. Of course the reverse is also true when the current price of university fees is lower than the exercise price, then the option will be worthless. For example, if a person buy an option for $1000 in 1999 with exercise price of $9000 in the year 2005. When in the year 2005, the university decides to lower the fee to 1000 only, then the option will be useless since it is not worth paying another $9000 in 2005 for something that cost only $1000. Determining the price for the option therefore is more complicated than for a stock. Accordingly this will depend on each of the aforementioned factors. The present invention addresses this issue. FIG. 1 is an overall system block diagram of a preferred embodiment of the present invention. In this embodiment, central controller 20 is linked up to at least one education agent ('agent') terminal 30 or registered user 30. This linked up can also be through the Internet through the Internet Service Provider (ISP) Gateway 6 or a network system whichever is preferable by the seller/provider at that time depending on economic costs of the system. Three terminals are depicted in FIG. 1 but any number of agent terminals can be used including those linked via the Internet 5. The link between the terminal 30 and the central controller 20 does not have to be a physical link-it can, for example be a link via a modem, as described in the subsequent description, or any other telecommunication link including wireless systems. An option transaction can be initiated from any one of the agent/users terminals 30. The information required to implement the transaction is passed until the transaction is complete. The central controller 20 keeps track of all transactions including transactions in the system. The system depicted in FIG. 1 may be embodied in hardware specially provided to implement the present invention. Alternatively, the system may be implemented using existing infrastructure such as using ISP Gateway 6 interface. The hardware and communication links may be change to incorporate this invention such as by way of reprogramming an existing server or by adding an additional file server (with or without a CPU dedicated to option transactions). Alternatively, the subject invention can be implemented by using existing hardware and software entirely by making appropriate software updates.

Figure 2:
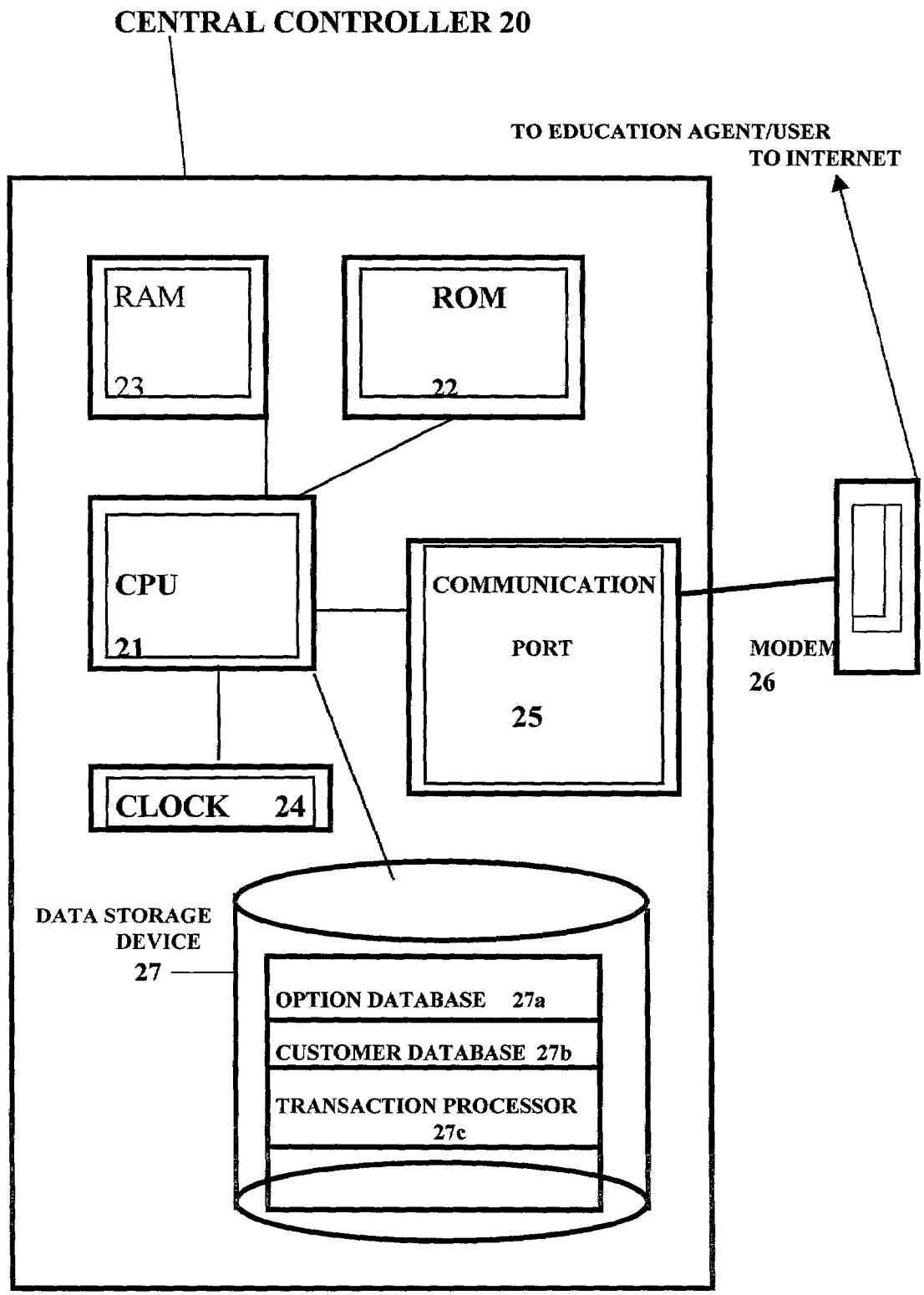
FIG. 2. Depicts the block diagram of the central controller

FIG. 2 is a block diagram of a preferred central controller 20. The central controller includes a CPU 21 which performs the processing functions of the controller. It is also includes a read only memory 22 (ROM) and a random access memory 23 (RAM). The ROM 22 is used to store at least some of the program instructions that are executed by the CPU 21 such as portions of the operating system or BIOS and the RAM 23 is used for temporary storage of data. A clock circuit 24 provides a clock signal which is required by the CPU 21. The use of a CPU 21 in conjunction with ROM and RAM and a clock circuit is accepted to those skilled in the design of the CPU based electronic circuit design. The central controller 20 also includes a communication port 25 which enables the CPU 21 to communicate with devices external to the central controller 20. In particular the communication port 25 facilitates communication between the modem 26 and the CPU 21, so that information arriving from the modem 26 can be processed by the CPU 21 and the CPU 21 can send information to remote location via the modem 26. While the illustrated embodiment uses a modem for communicating with devices outside the central controller, it should be understood readily that other methods of communicating with external devices may be used instead of the modem. These other methods include hard-wired connections, wireless such as radio frequencies, fibre optic lines and etc.

The CPU 21 can also store information to and read information from, the data storage device 27. This data storage device 27 includes an option database 27a and a customer database 27b, which are described below. In addition, it includes transaction processor instruction 27c which can be read by and executed by the CPU 21, thereby enabling the CPU 21 to process transactions. While FIG. 2 depicts separate option and customer databases, a single database that incorporates both of those functions may be used.

Figure 3:
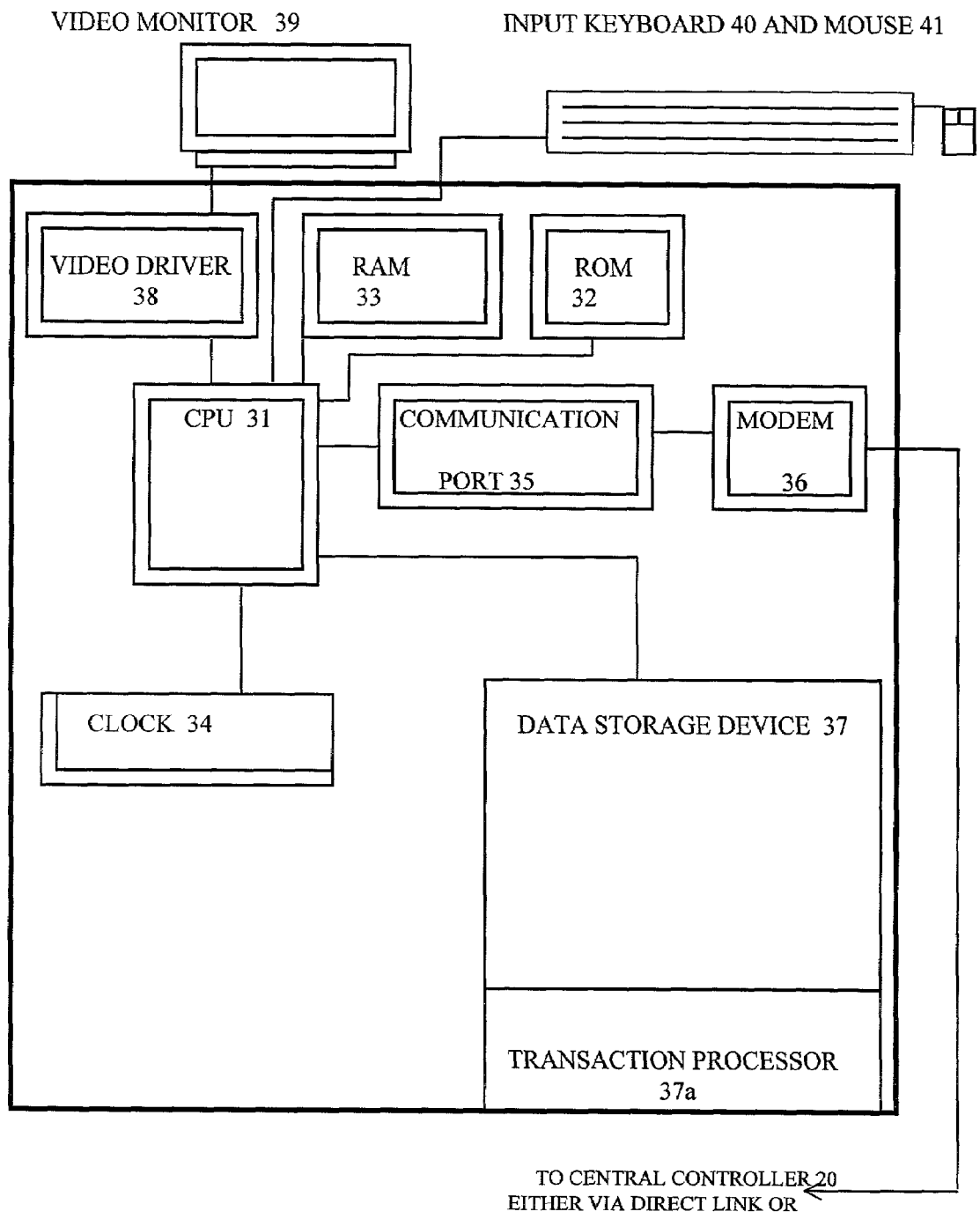
FIG. 3. Depicts the block diagram of the agent terminal and Internet connections.

FIG. 3 is a block diagram of a preferred agent terminal which can be located at an educational agency or university offices, a private home, or any establishment having the authority to lend itself to this network. As discussed there can be a number of agent terminals 30 linked to the one central controller 20. Like the central controller describe above, the agent terminal 30 includes a CPU 31, ROM 32, RAM 33 and a clock circuit 34. The agent terminal 30 also include a communication port which interfaces with a modem 36 that facilitates communication between the agent terminal 30 and the central controller 20. Of course instead of a modem 36 other communication devices can be used as shown above for the central controller 20. A standard computer such as an IBM PC, Apple Macintosh, running appropriate custom designed software may be used as the agent terminal.

The agent terminal 30 also includes an input device 40 to receive input from an operator. Any of a wide variety of input devices would be suitable including touch screen, mouse 41, keyboard 40. The input device 40 may interface directly with the CPU 31 as shown in the figure. Alternatively an appropriate interface circuit may be placed between the CPU 31 and the input device 40.

The agent terminal 30 also includes a video monitor 39 for conveying information to the operator. While the most preferred video monitor 39 is a CRT, other video display devices including LCD. LED and thin film transistor panels, may be used as well. Individual indicators may also be used to convey information to the operator, including incandescent and neon lamps. A video driver 38 interfaces the CPU 31 to the video monitor 39 (or to any other type of video display device). The agent terminal 30 also includes a data storage device 37 in which transaction processor instructions 37a are stored. These instructions can be read by and executed by the CPU 31 thereby enabling the CPU 31 to process transactions.

Figure 4:
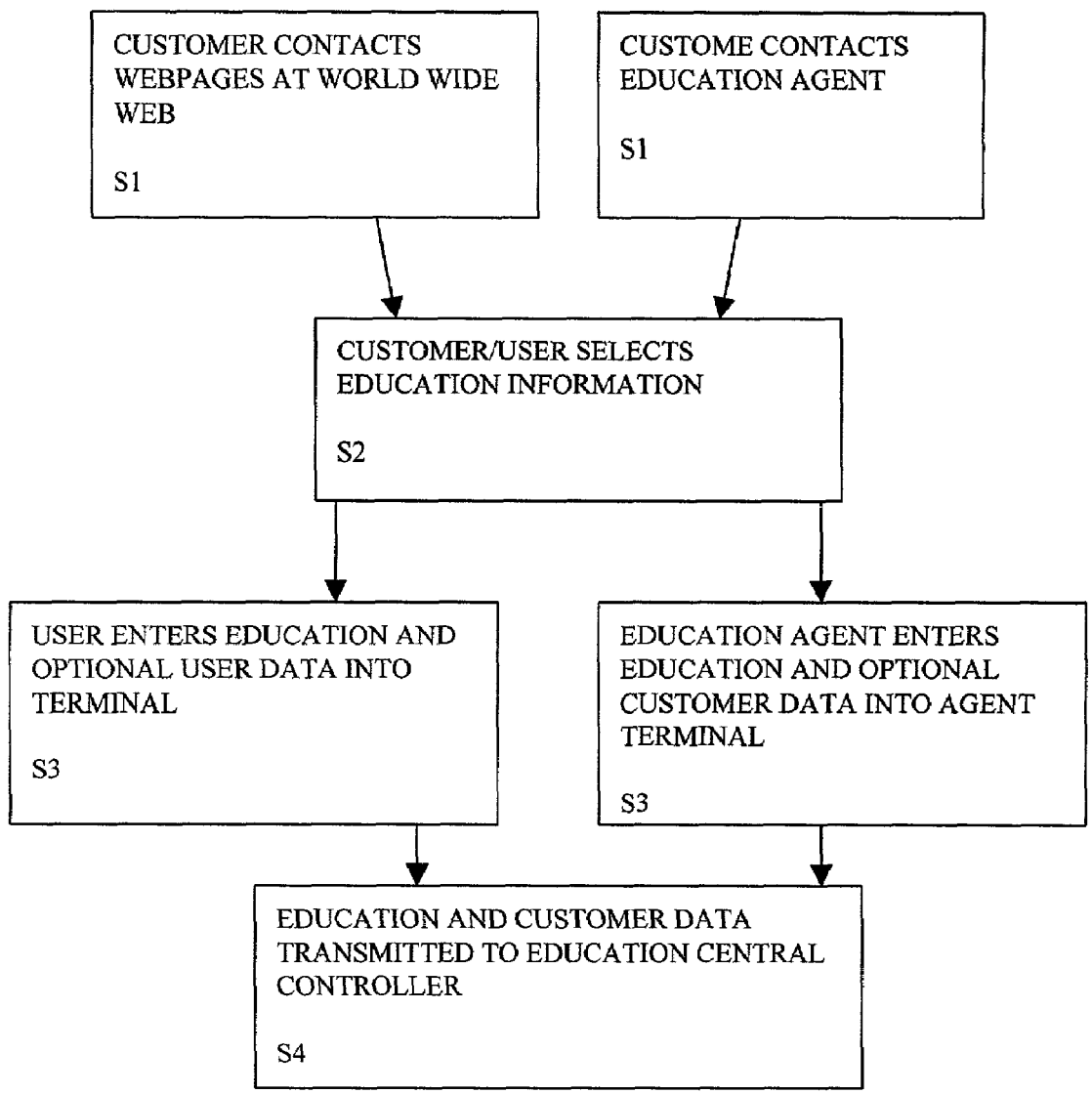
FIG. 4. Depicts the flow chart depicting initiations of a transaction in the agent terminal or through an Internet connection.
Figure 5:
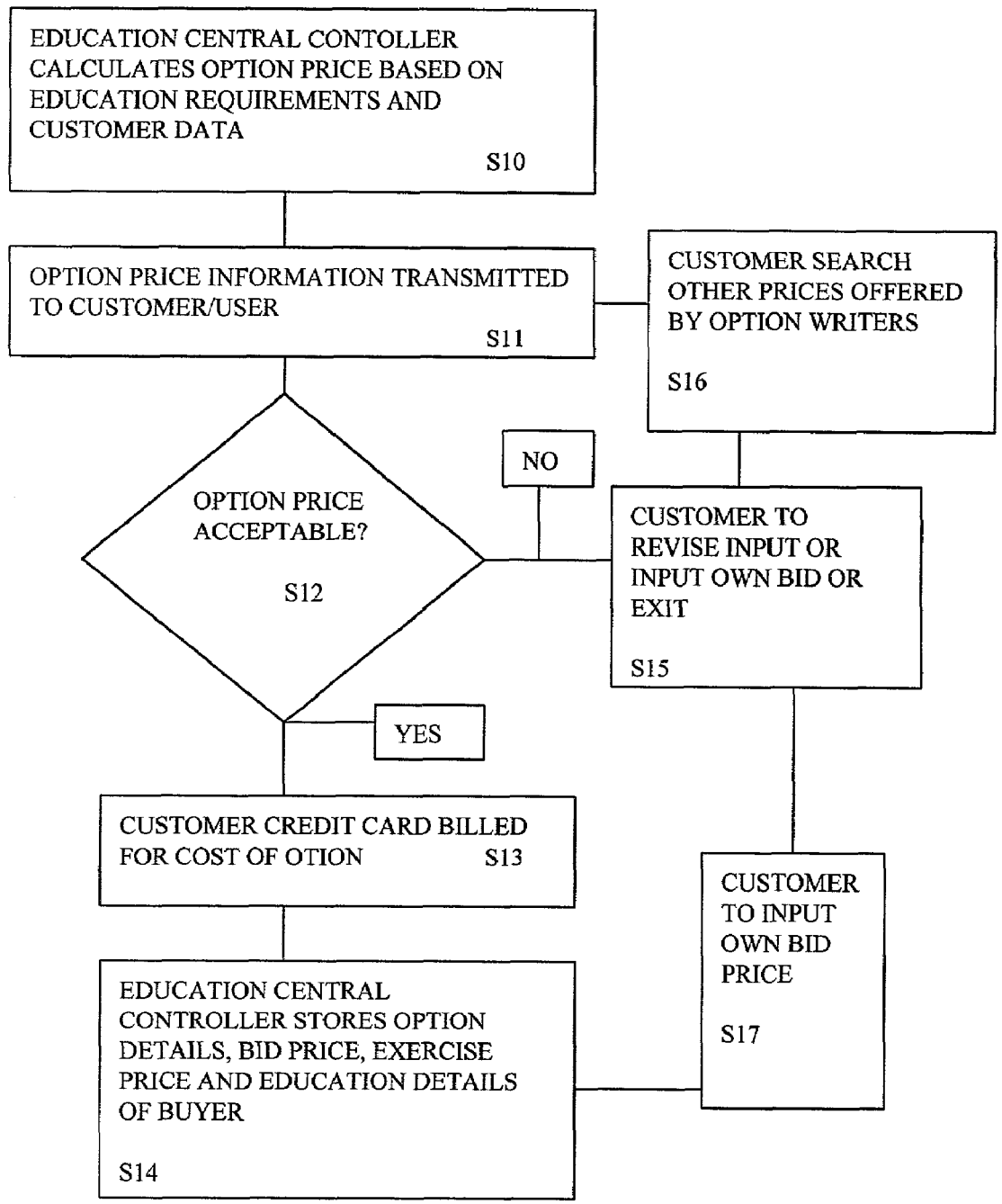
FIG. 5. Depicts the flow chart depicting the operation of controller and the final phase of operation of agent terminal.

FIG. 4 is a flow chart depicting the initiation of a transaction using an agent terminal 30. The steps of the process shown in FIG. 4 may be implemented in a computer program that may be installed at the agent terminal. For example a computer readable medium (such as a floppy disks or CD-ROMs) which is then stored in memory, in this case the data storage device 37 (Shown in FIG. 3). Alternatively, although not so describe below, the computer program be installed at the central controller 20 from a computer readable medium and then stored therein in one or more of the ROM memory 22, RAM memory 23 and data storage device 27 for access and use by agent terminals as required. The process starts when a customer contacts an education provider such as the University or its agent in step S1. Alternatively, a registered user can access it through the ISP Gateway 6 by using browser programs by applying the command htt://www.etc.com which will get connected to the central controller 20 (provided at that time the central controller 20 is connected to the ISP Gateway 6 as well) and where possible mirror sites are available for faster access. The customer selects the course information in step S2. This information comprises two components: the date of commencement and course criteria. The date of commencement criteria defines the time when the course is scheduled to begin. The course criteria refers to the actual course the customer is seeking to enrol such as say a medical degree, the university that he intends to seek entry, the cost of the course in the future time when enrolment is required and any special pre-requisite for enrolment into that course, for example under medicine, the potential customer may need to have an undergraduate degree of good standing. Such requirements may be different from university to university. Other information that may be incorporate are where the classes are held and time of classes or even as detailed as the actual syllabus for the courses as well. The course information is entered by either the customer or by an agent, into the agent terminal 30 in step S3. Customer data such as the customer's name, address, and telephone number, age, education background if any, may also be entered into the agent terminal 30 in step S3. The course information and the customer data are then transmitted to the central controller 20 in step S4. Returning to FIG. 3, each of the steps S1-S4 described above are executed by the CPU 31 which is executing transaction processor instructions 37a stored in data storage device 37. The communication with the central controller 20 takes place via the communication port 35 and modem 36 or as the case may be, with Internet 5 through ISP Gateway Interface 6. The information (and optional customer data) from the agent terminal 30 is received by the central controller 20. FIG. 5 is a flow chart of the operation of the central controller 20 after receiving of course information from the agent terminal 30. The steps of the process shown in FIG. 5 may be implemented in a computer program that may be installed in the central controller 20 from a computer readable medium and then stored therein in one or more of the ROM 22, the RAM 23 and the data storage device 27 (shown in FIG. 2). The central controller 20 calculates the price of an option in step S10 based on the course information received from the agent terminal together with information from the option database 27a.

When the course information includes similar courses being offered by the various universities, the price of the option may be simply the lowest price from a set of individual options unless the customer specifically selects an unique university. As the case maybe, the calculation of the option price may be determined by multiplying a base option price B by those factors that will affect the value of the options. The base option price may be a fraction of the price for which the option is being purchased for example 30 percent. Generally the fraction will decrease as the course fees for which the option was purchased approaches the full price or near the expiring date. The variables used to calculate the option price from the base option be continuously or discretely variable. One set of discretely varied variables is described in the table below, which assumes the base price to be 30 percent of the price. Another way to do this is to ask for the exercise price first, this is the price the user is willing to pay to fully pay up the educational course and from there we calculate the premium required to hold this position of the option price. There are according to this invention many ways of calculating the value and as such these methods are only for demonstration purposes. In my final product, a combination of a few of the methods will be applied. In the final analysis, those most responsive will be adopted and refine while those which are not will be abandon.

| A factor relating to the number of years before commencement of course. In this example D increases as the number of years increase | |
|---|---|
| 1 year | 0.8 |
| 2 years | 1.0 |
| 3 years | 1.2 |
| 4 years | 1.5 |
| 5 years | 1.8 |
| 6 years | 2.1 |
| 7 years | 2.4 |
| 8 years | 2.6 |
| 9 years | 2.8 |
| 10 years | 3.9 |
| >10 years | 3.2 |

L A factor related to the expected enrolment on the subject course. In this example, L increases as the expected demand increases, typically we assume that courses such as medicine has a higher demand than a social course such as geography.

| High Demand | 1.2 |
|---|---|
| medium | 1.0 |
| low demand | 0.7 |

C A factor relating to the desirability of the customer. For example, a customer who has done a degree with the same university that he is applying will be regarded as excellent, a customer who has no record of any education achievement at all will be considered a low status. This includes unborn infants.

| Excellent | 0.7 |
|---|---|
| Good | 0.8 |
| Average | 0.9 |
| Pass | 1.0 |
| Low | 1.1 |

R A factor related to the flexibility of the customer's education plans. For example, a customer who is willing to consider other courses or universities is considered as flexible.

| Flexible | 0.7 |
|---|---|
| Not Flexible | 1.1 |

V A factor relating to the historical volatility of education courses cost/fees. In this example, V increases as price volatility increase as measure in standard deviation terms or SD increases.

| Changing by more than 9 percent on a year to year basis | 1.3 |
|---|---|
| Some Changes of up to 8 percent on a year to year basis | 1.1 |
| Stable No Changes | 0.8 |

Using these variables, a suitable algorithm for calculating an appropriate option price is as follows:

$$\text{Option Price} = B*D*L*C*R*V$$

It should be mentioned that conditions and changes may be made to the above formula from time to time to reflect changes in the environment. The above is only an example for demonstration purposely. More sophisticated formula may be used to arrive at a suitable option price. Once the option price information has been calculated as shown above, it is transmitted to the customer in step S11. This option price information may be a single price for an option to buy, for a particular price, a course fee that matches the customer's course information. It may also be a set of prices for each of a plurality of different course fees.

As an example, assume a customer wants to purchase an option to buy an engineering course fee at USD 10,000. Further assume that the commencement date is 5 years from now (1.8), the course has a medium demand (L) of 1.0, he has an excellent track record at school (C) 0.7, he is not flexible (R) 1.1 and the course fees standard deviation is stable (V) 0.8. The base option price is USD 10,000 *0.3=USD 3, 000 and the final option price is USD 3,326, calculated as follows $$3000*1.8*1.0*0.7*1.1*0.8 = 3,326$$

After the price information is transmitted to the customer in step S11, the customer decides whether to purchase the option in step S12. If he decides to purchase the option, the system can process the sale by billing the customer's credit card in step S13. Of course, alternate methods of payment may be used instead of a credit card, including payment by cash, credit, check, debit card, gift certificate, and the like each consistent with monetary value equivalent to the above. If the customer decided not to purchase an option during step S12, the customer is given a chance to revise the course information in step S15 or exit or input his own bid S17 or scan other bid/offers S16 . By adding more flexibility in his education plans, the customer may be able to find an option that is suitably priced. He may also wish to put in his own bid S17 and let Universities that may be interested to make an offer or other options buyer may be interested to sell to him based on the above requirements S16. The system is designed to be flexible so that there is liquidity in the market to allow transactions to take place. He may also scan/search other offers by covered or non-covered option writers who are willing to sell a similar option if he is still not satisfied with what is available to him by the central controller 20. The credit card transaction may be carried out by the central controller 20 or by the agent terminal 30 with all records updated instantly. Transactions processed through the agent terminal 30 maybe be carried out using the same modem 36 that is used to communicate with the central controller 20. Alternatively an additional modem (not shown here) may be included in the agent terminal 30 to process the credit card transactions. Alternative the normal credit merchant account may be used to facilitate the transaction. After the sale is completed, the option database (27a in FIG. 2) is updated in step S14 to reflect the fact that a particular option has been sold. The number of options sold for a particular course may be used by the system as a factor in determining the price to be sold in the future. More specifically, when the number of options outstanding for a given course rises, the price for subsequent purchase of similar options may be raised to compensate the university/institute of higher learning for the additional risk of having to sell a large number of course fees for a particular course. For the above example, this factor was not shown in the formula. The customer database (27b in FIG. 2) may also be updated to indicate that a particular customer has purchased or sold a given option. This customer database may be used for various purposes including billing, messaging and marketing particularly using Internet based technology such as electronic mails subject to authorisation by the customer.

Figure 6:
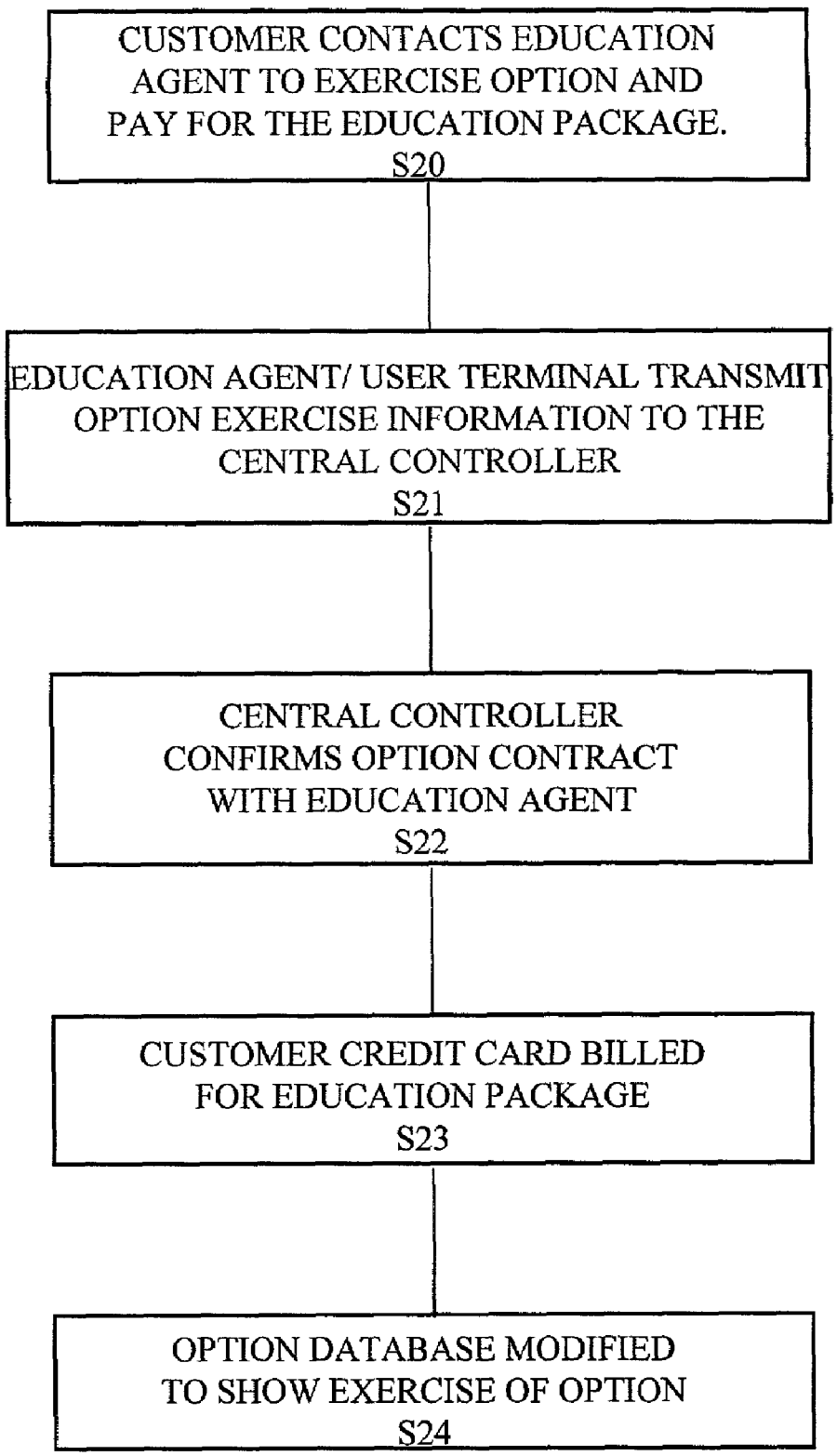
FIG. 6. Depicts a flow chart depicting the operation of the when an option is exercised.
Figure 7:
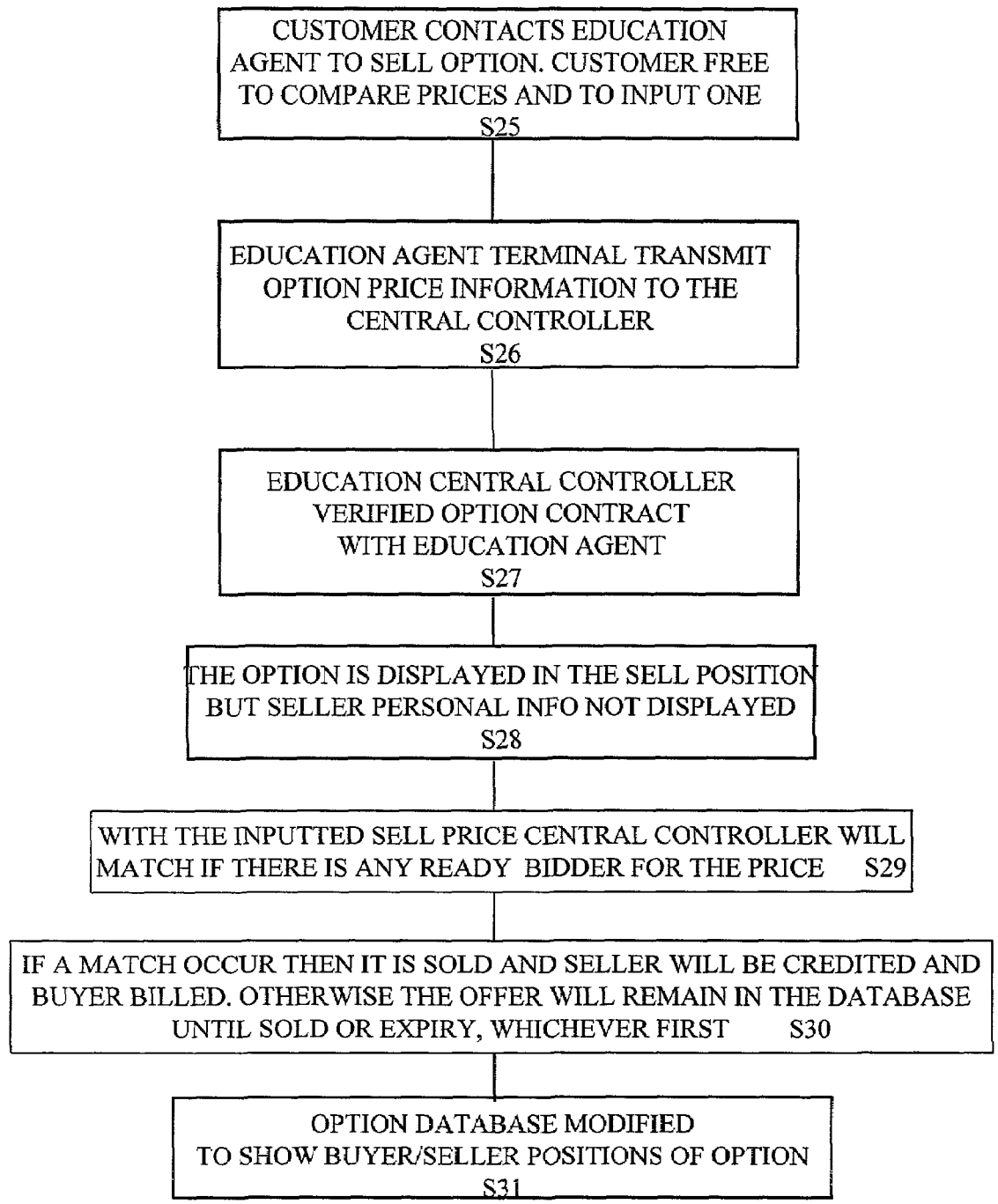
FIG. 7. Depicts a flow chart depicting the operation of an option being sold, marketed to be sold or match to be sold.

FIG. 6 is a block diagram depicting operation of the system when a customer exercises an option. The steps of this process may be stored on a computer readable medium which in this case would be the data storage devices 27 and 37 (shown in FIGS. 2 and 3). First, in step S20, the customer contacts the education agent and indicates that he wishes to exercise a previously purchase option and purchase/pay for the university course. Alternatively, the registered user may try to access through the ISP Gateway 6 into the Internet 5 to link into the central controller 20. After the operator of the agent terminal 30 enters the information describing the option and customer details, the agent terminal 30 transmits the option exercise information to central controller 20 in step S21. The central controller 20 then confirms that the option contract does in fact exist and is current (not expired) as shown in step S22. The customer's credit card is then billed for the education course specified by the option being exercised in step S23. The specifics of charging the customer for the university course are similar to the specifics of charging the original purchase of the option. The option database 27a in the central controller 20 (shown in FIG. 2) is subsequently updated to show that the option has been exercised as shown in step S24. FIG. 7 is a block diagram depicting operation of the system when a customer wishes to sell an option. The steps of this process may be stored on a computer readable medium which in this case would be the data storage devices 27 and 37 (shown in FIGS. 2 and 3). First, in step S25, the customer contacts the education agent and indicates that he wishes to sell a previously purchase option for the university course. After the operator of the agent terminal 30 enters the information describing the option and customer details, the agent terminal 30 transmits the option information to central controller 20 in step S26. The central controller 20 then confirms that the option contract does in fact exist and is current (not expired) as shown in step S27. The information pertaining to the sell is displayed for all to see S28. The central controller 20 will search the database 27a and match any ready bid for the option S29. If there is a match, then it is sold and the seller be credited and buyer be billed S30. Option database will be modified to show the change of ownership and obligation S31 otherwise unsold option will be stored until sold or expired whichever come first S30.

FIG. 8 depicts the format of the World Wide Web interface format. With this availability, any person may access the central controller 20 through the Internet 5 by using ISP Gateway 6. While it is freely available to the public, as shown here, functional access is still very much controlled by central controller 20. While the above description contemplates the creation, buy, sale, transfer of an option with a fixed expiration date at a particular price, alternative pricing configurations may also be used for example, options that can be extended for a fee. Or part or the full amount of the option price can be credited towards the purchase of the course fees later, thus requiring on the balance amount to be payable on exercised. After an option is issued by the respective universities/institute of higher learning/education facilitators, they can reserve a seat in the course covered by the option, and cancel the reservation when the option expires.

Alternatively, they can do nothing until the option is exercised, and at that point reserve the customer's requirements as per the contract made. If this results in overbooking, then traditional way is to open more classes for that particular course. The control is always with the provider of education since they are the sellers of these options. That is to say, they can limit the number of seats for a particular course on a first come first serve basis subject to the candidates satisfying their requirements. In a way, they will be prepared for the number of students they wish to take in with no surprises. There is no worry for any lowering of standards just because the fees were pre-sold earlier. The only question left is what about those traditional students who wish to study for a particular course and had not purchase an option prior to this. There are two solution, that is the education institution would have foreseen this and made arrangements for them, perhaps offering some places reserves for this category. The main distinction here is that unlike buying a football ticket to watch a show, purchasing an option to pay for a particular course does not guarantee one of admission in the faculty. What it does with this option is to guarantee the course fees will be fixed today rather than in the future. Entry is still based on merits and will remain so as no education provider can ever sought to sell places in their establishment. Given the scenario that a customer has bought an option but unable to get in because of subsequent poor performance, he can elect to sell his option either back to the University or to another potential student. There is going to be demand as other qualified students may not have pay for the fees yet given the numbers are fixed. At the final date, that is the date of expiring of option, the price of the instrument will converge to the real prevailing price of the fees so there can never be a higher price. That is to say, if the final price (is known by the time places are offered) is USD 10,000, then the option with an exercise price of USD 7000 is only worth USD 3000. Given that a reasonable time span has elapsed and there is potentially more demands since those who got a seat in the faculty would like to be able to pay the fees now, they will want to purchase such option or alternative pay the spot price of the course fees. The spot price may be higher which will drive the value of the option to be higher as well. The option holder will not lose out since he has an opportunity to sell back to the university or anyone who is willing to buy at that time. Another possibility is that there are no students who wish to study for a particular course and hence no one is willing to buy over the option from the seller who did not gain entry due to unacceptable performance. The University in this case shall reserve its right to purchase the option back. This is a crucial point to recognise that in buying an option, there is no obligation for the seller of the option to purchase it back when the circumstances are unfavourable to the buyer or vice-versa. When buying any option instruments, the buyer should recognise this risk and it is up to the terms and policy provided by the seller at the point of sell and embedded in the contract itself. In taking the risk to hedge against a potential higher price in education course fees, the buyer must recognise and hence determine his risk orientation as well as his own ability to gain admission as well.

In another scenario, preference therefore must be given where both buyer of an option and an non-option holder have to qualify for the last available seat. Convention here would dictate that the buyer of an option be given the first preference given both have achieved similar credits in admission. This is in line with the principle of first come first serve given equal standing to the position. The option buyer has clearly demonstrated that he has already a foot in by paying up in the past and by performance this is enough to give him an advantage. The University/education provider in this case need not compromise its education standards by receiving sub-standard candidates. What is more important here is to recognise the option facility here is an hedge against rising cost of education fees, provide some market forces to determine its pricing, help to secure funding for the education providers and to plan for student intakes. It is not one to secure a position in the education course and can never be without compromising on the standard of education.

INDUSTRIAL APPLICATION

This systems according to the invention possesses several advantages over existing arrangements in reducing the cost of funding and improve the student intake in targeting the right users. It also attracts more audience by providing incentives such as discounts (discount here refers to the cost of money over time) or at least by locking in the cost of education. It also helps educators to get connected to users who would initiate a relationship immediately based on the information they received. This may not be so significant now by as the technology involved, there will be opportunities for would be student to tailor their courses and universities merging to give an universal education to students. There will be networking between universities and as such this design will enhance knowledge gathering and decision making for the administrators.

Unlike traditional method of funding for universities which uses mass appeal concepts to sell to government, private foundations, the up-front premium is an easier and less intrusive means of securing funds. It will also allow they to make a more informed decision about the potential student's interest and plan for their coming.

Furthermore, this structure is much more cheaper and less administratively consuming. For traditional means of securing funding, the university has to justify the area of research in terms of commercial potential, the number of potential students etc. Most of these are beyond the knowledge scope of the researchers at that time and do not distinguish the difference between basic research and applied research. As this is an interactive system, the users will always have control and can determine when they can buy/sell, how much to take and when to stop. There will be some form of control within the system design to prevent abuse such as those found in the stock market.

I claim:

1. A computer implemented method for user to contract a future education fee amount now for an education course and optionally paying for said contracted education fee in future subject to gaining admission to said course, comprising steps:
receiving education information including data representative of a single selected education course and a single selected institution from an user over a network connected to a computer having memory with a data structure stored in said memory, said data structure comprising first data representative of volatility of education course prices;
said computer using said information with said first data, calculating an education option price in consideration to contract the future education fee amount as determined by the user for said single selected education course and said single selected institution;
outputting the education option price for consideration by the user;
the user paying for the education option; and
updating said data structure with said education option having a right but not an obligation to pay said future education fee for said single selected course on condition of being offered admission to the single selected course by said single selected institution before commencement date of the single selected course for said user.

2. The method according to claim 1, whereby said consideration is paid to said selected institution by said user.

3. The method according to claim 1 further comprising the step of receiving an indication that the user has purchased the education option and updating a database to reflect sale of said option.

4. The method according to claim 1, further comprising the step of receiving education option sales information from an option database indicating a number of similar options that have been previously sold or written, and wherein the calculating steps use the option sales information in determining the option price.

5. The method according to claim 1, further comprising:
receiving a request from a user to exercise the education option;
verifying said user has been admitted to the selected course;
upon verification, performing an online financial transaction to pay the education fee contracted in the education option to said selected institution; and
updating the option's status.

6. The method according to claim 1, wherein the education option price is based in part upon a formula below:

$$\text{Option price} = B*D*L*C*R*V;$$

whereby B is base price for the option, D is a factor related to a desired number of years before commencement of course, L is a factor concerning expected enrollment demand on the subject course, V is a factor concerning the volatility of education course prices, and C is a factor related to desirability of the user, and R is a factor related to flexibility of the user's education plans.

7. The method according to claim 1 further includes selling said education option by said user.

8. A computer implemented method for user to contract a future education fee amount now and optionally paying for said education fee in future; comprising steps:
receiving education information from an user over a network;
in response to said information, calculating an education option price wherein the calculating is based in part upon a formula below:

$$\text{Option price} = B*D*L*C*R*V;$$

whereby B is base price for the option, D is a factor related to a desired number of years before commencement of course, L is a factor concerning expected enrollment demand on the subject course, V is a factor concerning the volatility of education course prices, and C is a factor related to desirability of the user, and R is a factor related to flexibility of the user's education plans;
outputting the education option price for consideration by the user;
the user paying for the education option; and
revising said education information.

9. In a computer system having a computer processor and a memory operatively coupled to the computer processor, the computer comprising:

one or more database for storing first data representative of volatility of education course prices;

said memory having at least one region for storing executable program codes and said processor executing the program codes stored in the memory causing the computer to determine an education option price when executed by said processor, wherein the program code comprising:

a code segment to receive education information including data representative of a single selected education course and a single selected institution from an user over a network;

a code segment to use said information with said first data and calculating the education option price in consideration to contract a future education fee amount as determined by the user for said single selected education course and said single selected institution;

a code segment to output the education option price for consideration by the user;

a code segment to receive payment from the user for the education option; and a code segment to update said database with said education option having a right but not obligation to pay said future education fee for said single selected course on condition of being offered admission to the single selected course by said single selected institution before commencement date of the single selected course for said user.

10. The system according to claim 9 whereby said consideration is paid to said selected institution by said user.

11. The system according to claim 9 wherein the program code further comprising a code segment to receive an indication that the user has purchased the education option and updating a database to reflect the sale of said option.

12. The system according to claim 9 wherein the program code further comprising a code segment to receive education option sales information from an option database indicating a number of similar options that have been previously sold or written, and wherein the calculating use the option sales information in determining the option price.

13. The system according to claim 9 wherein the program code further comprising:

a code segment to receive a request to exercise the education option;

a code segment to verify user has been admitted to the selected course;

a code segment to perform an online financial transaction to pay the education fee contracted in the education option to said selected institution upon verifying said user is admitted ; and updating the option's status.

14. The system according to claim 9 wherein the code segment for calculating the education option price is based in part upon a formula below:

Option price $=B*D*L*C*R*V$;

whereby B is base price for the option, D is a factor related to a desired number of years before commencement of course, L is a factor concerning expected enrollment demand on the subject course, V is a factor concerning the volatility of education course prices, and C is a factor related to desirability of the user, and R is a factor related to flexibility of the user's education plans.

15. The system according to claim 9 further comprising a code segment to sell said education option by said user.

16. A computer program embodied on a computer readable medium for causing a computer to determine an education option price when executed, said program comprising:

a code segment to receive education information including data representative of a single selected education course and single selected institution from an user over a network;

a code segment to connect to a memory having a data structure stored in said memory, said data structure having a first data representative of volatility of education course prices;

a code segment to use said information with said first data and calculating an education option price in consideration to contract a future education fee amount as determined by the user for said single selected education course and said single selected institution;

a code segment to output the education option price for consideration by said user;

a code segment to receive payment from the user for the education option; and a code segment to update said data structure with said education option having a right but not an obligation to pay said future education fee for said single selected course on condition of being offered admission to the single selected course by said single selected institution before commencement date of the single selected course for said user.

17. The computer program according to claim 16 whereby said consideration is paid to said selected institution by said user.

18. The computer program according to claim 16 wherein the program code further comprising a code segment to receive an indication that the user has purchased the education option and updating a database to reflect sale of said option.

19. The computer program according to claim 16 wherein the program code further comprising a code segment to receive education option sales information from an option database indicating a number of similar options that have been previously sold or written, and wherein the calculating use the option sales information in determining the option price.

20. The computer program according to claim 16 wherein the program code further comprising:

a code segment to receive a request to exercise the education option;

a code segment to verify user has been admitted to the selected course;

a code segment to perform an online financial transaction to pay the education fee contracted in the education option to said selected institution upon verifying said user is admitted; and a code segment to update said option's status.

21. The computer program according to claim 16 wherein the education option price is based in part upon a formula below:

Option price $=B*D*L*C*R*V$;

whereby B is base price for the option, D is a factor related to a desired number of years before commencement of course, L is a factor concerning expected enrollment demand on the subject course, V is a factor concerning the volatility of education course prices, and C is a factor related to desirability of the user, and R is a factor related to flexibility of the user's education plans, of education course prices.

22. The computer program according to claim 16 further comprising a code segment to sell education option by said user.

* * * * *